(No Model.)

J. S. THORPE.
PIANO TUNING PIN LOCK.

No. 259,604. Patented June 13, 1882.

Witnesses
J. H. Shumway
Jos. C. Earle

James S. Thorpe
By atty.
John E. Earle
Inventor

UNITED STATES PATENT OFFICE.

JAMES S. THORPE, OF WATERBURY, CONNECTICUT.

PIANO-TUNING-PIN LOCK.

SPECIFICATION forming part of Letters Patent No. 259,604, dated June 13, 1882.

Application filed November 16, 1881. (No model.)

*To all whom it may concern:*

Be it known that I, JAMES S. THORPE, of Waterbury, in the county of New Haven and State of Connecticut, have invented a new Improvement in Piano-Pin Locks; and I do hereby declare the following, when taken in connection with the accompanying drawings and the letters of reference marked thereon, to be a full, clear, and exact description of the same, and which said drawings constitute part of this specification, and represent, in—

Figure 1:
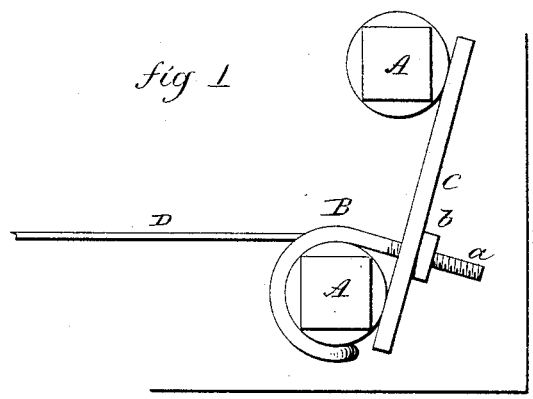
Figure 2:
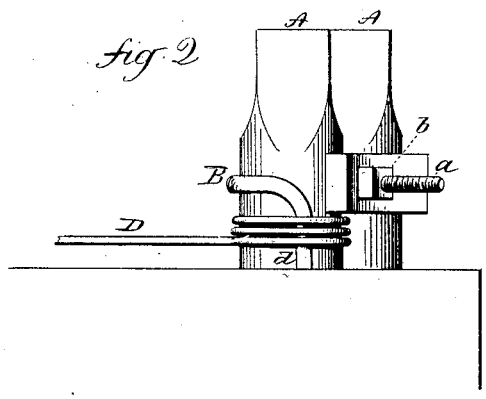

Figure 1, a top view; Fig. 2, a side view; both three times natural size.

This invention relates to an improvement in locking the pins of piano-fortes so as to prevent a letting up of the wires after they have been drawn to the proper tension; and it consists in a clamp arranged to grasp the wires, one end of which extends outward through a bar, toward which it may be drawn to force the clamp upon the pin, the other turned between the pin and wire, as more fully hereinafter described.

A A represent the common pins, such as used in pianos of common construction. Usually these pins are held simply by the friction in their own seats, which is supposed to be sufficient to hold the pins when they are turned to give the required tension to the wires; but it frequently occurs that this friction is not sufficient, and if not sufficient, then the strain of the wire is reduced and its tone consequently lowered, a serious difficulty in the use of pianos.

B is a piece of wire, one end bent around the pin, as seen in Fig. 1, the other end extending outward through a bar, C, which is arranged preferably to bear upon the pin, and also upon the next adjacent pin, as seen in Fig. 1. The outer end, $a$, of the wire B is screw-threaded, and provided with a nut, $b$, by which the bent part of the wire may be drawn hard against the pin, as seen in Fig. 1, and so as to create sufficient friction between the pin and the wire or clamp B to overcome any strain which may be placed upon the wire D, which is attached to the pin. When the wire is to be tuned the clamp is relaxed by loosening the nut $b$, then the pin is turned until the desired tension is attained, and then the nut $b$ reset to clamp and hold the pin in that position. By this construction the pin may be fitted so loosely in its seat as not to produce much friction therein, and in consequence of this loose fit of the pin it is much easier to tune the wire than it can be in the usual construction, because there is not the usual friction to overcome. I turn the end of the clamp B down upon the side of the pin, as at $d$, Fig. 2, and so that the wire, when wound upon the pin, is wound outside of this turned-down end. This arrangement holds the end of the clamp firm against the pin and prevents its slipping upon the surface. Then, when the pin is turned, as in straining the wire, it will unwind the clamp—that is to say, the confined end $d$ will follow the pin in turning, while the other end will be forced outward through the bar C. The movement of the pin is so small that it does not interfere with the proper action of the clamp or make it difficult to so employ the pin.

Instead of employing the nut $b$ to produce the clamping of the pin, other devices, well-known equivalents for the nut and screw, may be employed. I therefore do not wish to limit my invention to the employment of a nut and screw.

Instead of arranging the bar C as described, so as to bear upon the pins, it may be a bar or ledge attached to the frame independent of the pins. Instead of the bar, it may be simply a stud set into the frame, through which the end of the clamp will pass in like manner as it does through the bar, it only being essential that the support for the clamp shall be stationary or arranged so that the clamp may be drawn upon the pin to produce the required friction. Therefore, by the term "bar," as used in the claim hereinafter, I wish to be understood as embracing any suitable support for the said clamp.

I claim—

The herein-described lock for piano-pins, consisting of the clamp B, taking a bearing upon the surface of the pin, with one end extending through a stationary bar, and with a clamping device, substantially such as described, on the opposite side of the said bar to draw the clamp into frictional contact with the pin, the other end of the clamp extending down on the surface of the pin, and between the pin and the wire thereon, substantially as described.

JAMES S. THORPE.

Witnesses:
JOHN O'NEILL, Jr.,
ARETES W. THOMAS.